(12) United States Patent
Lindskog et al.

(10) Patent No.: US 7,372,911 B1
(45) Date of Patent: May 13, 2008

(54) BEAM FORMING AND TRANSMIT DIVERSITY IN A MULTIPLE ARRAY RADIO COMMUNICATIONS SYSTEM

(75) Inventors: Erik D. Lindskog, Sunnyvale, CA (US); Mitchell D. Trott, Mountain View, CA (US)

(73) Assignee: ArrayComm, LLC, San Jose, CA (US)

( * ) Notice: Subject to any disclaimer, the term of this patent is extended or adjusted under 35 U.S.C. 154(b) by 744 days.

(21) Appl. No.: 10/187,231

(22) Filed: Jun. 28, 2002

(51) Int. Cl.
*H04L 1/02* (2006.01)

(52) U.S. Cl. .................................... 375/267

(58) Field of Classification Search ............. 375/260, 375/267, 285, 295, 299, 316, 346, 347, 349; 455/63.1, 65, 101, 103, 132, 278.1, 272, 455/277.2, 561, 562.1, 115.1; 370/252, 334, 370/350
See application file for complete search history.

(56) References Cited

U.S. PATENT DOCUMENTS

| | | | |
|---|---|---|---|
| 6,321,066 B1 * | 11/2001 | Katz et al. ................. | 455/25 |
| 6,370,182 B2 * | 4/2002 | Bierly et al. .............. | 375/140 |
| 6,392,595 B1 * | 5/2002 | Katz et al. ................. | 342/367 |
| 6,469,680 B1 * | 10/2002 | Kelliher ..................... | 343/893 |
| 6,539,209 B1 * | 3/2003 | Dajer et al. ................ | 455/101 |
| 6,671,499 B1 * | 12/2003 | Ylitalo et al. ............. | 455/101 |
| 6,754,467 B1 * | 6/2004 | Ide et al. ................... | 455/25 |
| 6,898,441 B1 * | 5/2005 | Kogiantis et al. ......... | 455/562.1 |
| 2003/0092379 A1 * | 5/2003 | Brothers et al. ........... | 455/12.1 |
| 2003/0144032 A1 * | 7/2003 | Brunner et al. ............ | 455/562 |
| 2004/0082299 A1 * | 4/2004 | Brunner et al. ............ | 455/101 |

FOREIGN PATENT DOCUMENTS

DE 10026077 A1 12/2001

\* cited by examiner

*Primary Examiner*—Khanh C. Tran
(74) *Attorney, Agent, or Firm*—Blakely Sokoloff Taylor & Zafman LLP

(57) ABSTRACT

A method and apparatus are provided for selecting transmission parameters for multiple transmit antenna arrays. In one embodiment, the invention includes receiving a signal from a remote radio, measuring the transmit coherency of the received signal, selecting, based on the transmit coherency, whether to apply coherent combining to signals transmitted to the remote radio using each of two transmit antenna arrays to each form a beam to coherently combine with each other beam upon receipt by the remote radio, selecting, based on the transmit coherency, whether to apply transmit diversity to signals transmitted to the remote radio using each of the two transmit antenna arrays as diversity antennas. The embodiment further includes determining signal transmission parameters to apply to the two antenna arrays for transmissions to the remote radio based on the selections, and transmitting a signal to the remote radio from the two transmit antenna arrays by applying the determined signal transmission parameters to the two transmit antenna arrays.

46 Claims, 6 Drawing Sheets

BEAM FORMING AND TRANSMIT DIVERSITY IN A MULTIPLE ARRAY RADIO COMMUNICATIONS SYSTEM

BACKGROUND OF THE INVENTION

1. Field of the Invention

The invention relates generally to the field of digital radio signal communications. More particularly, the invention relates to measuring signals received at different antenna arrays to determine transmit parameters for multiple transmit antenna arrays.

2. Description of the Related Art

Radio communications are sensitive to the environment in which the radio signals are transmitted and received. Communications can be lost or degraded when the environment is not favorable to the type of signals being transmitted. One particular environmental problem is fading due to scattering. This problem can cause multipath interference or completely prevent reception of a transmitted signal. One known way to mitigate fading due to scattering is to use receive or transmit diversity. Spatial receive diversity typically uses two receive antennas spaced a distance from each other. The receiver will either choose the antenna that receives the strongest signal or combine the signals from both antennas.

Delay receive diversity uses a single antenna and searches for multipath copies of a signal delayed in time. A RAKE receiver or an equalizer then combines the two or more signals to resolve the original single signal. Many digital cellular telephones are required to have receivers that can resolve signals with a number of chips or symbols of delay spread depending on the system.

Transmit diversity works much like receive diversity in reverse. Signals can be transmitted from spaced apart antennas. Transmit diversity schemes can enhance reception significantly under certain circumstances. However, they increase the complexity of the transmitter and the receiver. Also, for some environmental conditions, diversity transmission can reduce the quality of the received signal.

BRIEF SUMMARY OF THE INVENTION

A method and apparatus are provided for selecting transmission parameters for multiple transmit antenna arrays. In one embodiment, the invention includes receiving a signal from a remote radio, measuring the transmit coherency of the received signal, selecting, based on the transmit coherency, whether to apply coherent combining to signals transmitted to the remote radio using each of two transmit antenna arrays to each form a beam to coherently combine with each other beam upon receipt by the remote radio, selecting, based on the transmit coherency, whether to apply transmit diversity to signals transmitted to the remote radio using each of the two transmit antenna arrays as diversity antennas. The embodiment further includes determining signal transmission parameters to apply to the two antenna arrays for transmissions to the remote radio based on the selections, and transmitting a signal to the remote radio from the two transmit antenna arrays by applying the determined signal transmission parameters to the two transmit antenna arrays.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Figure 1:
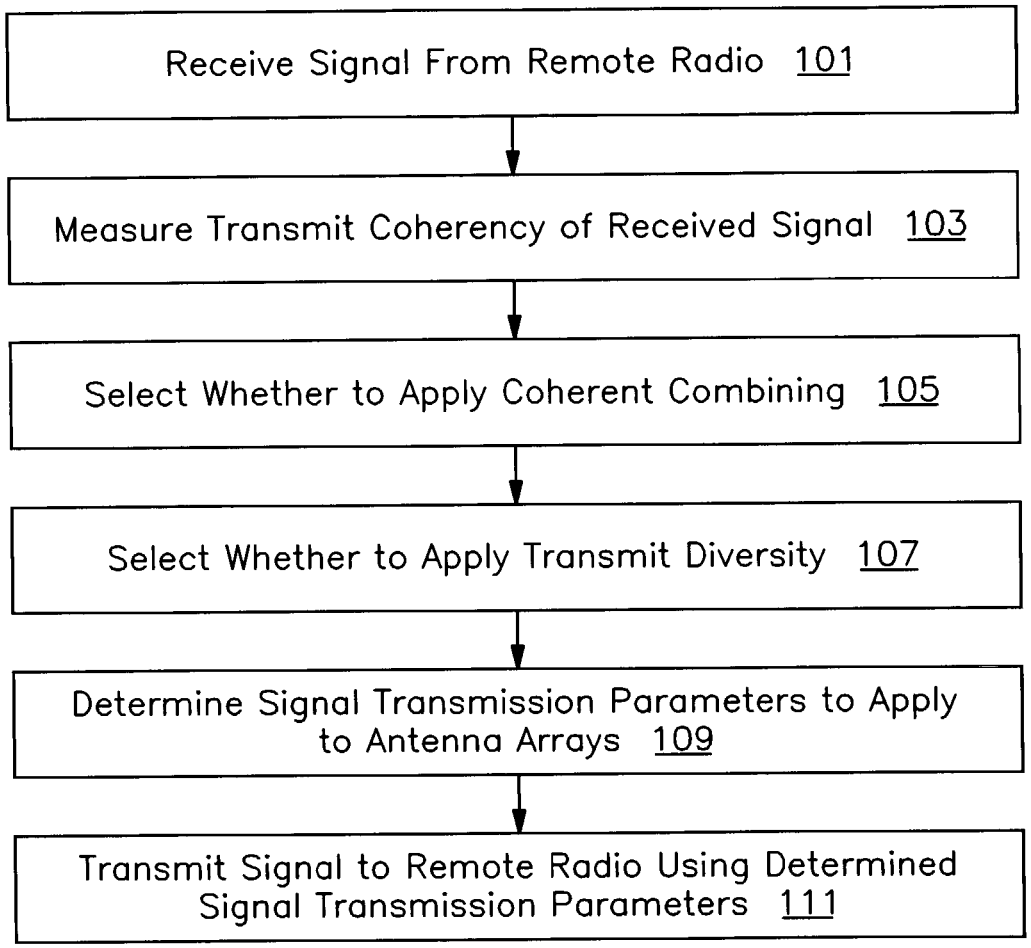
FIG. 1 is a flow chart showing an embodiment of the present invention.

Transmit diversity can be applied in a beam forming system using multiple antenna arrays. Each array can have a set of antenna elements to implement a beam forming strategy for that array and the arrays can be used together to either reinforce the beam forming strategies of the individual arrays or to provide transmit diversity in addition to the beam forming strategy. The different arrays can be physically spaced apart from each other for spatial diversity or have their elements oriented in different directions for polarization diversity. By combining strategies for individual arrays with a strategy for the arrays working together, the power delivered to a remote user can be maximized.

In one embodiment of the invention, two arrays, each with several elements, are spaced apart from each other by ten or more wavelengths of a carrier wave. When a remote radio has a clear channel to the two arrays, such as a line-of-sight signal propagation path or a channel with low angular spread, each array can direct a beam directly to the remote radio. In addition, the formed beam from each array can be phased so that the two beams coherently combine in the propagation path to the remote radio. Using the two spatially separated arrays together provides greater beam forming precision, increasing the power directed to the remote radio and reducing the power directed to other users of the network.

On the other hand, when the remote radio has a poor channel, for example a channel with a large angular spread, the two antenna arrays can be phased to produce two independent beams to the remote radio. The two independent beams can be directed along different paths to the remote radio and be combined in a transmit diversity scheme. This may improve the remote's ability to receive the signal. In addition, by using antenna arrays each with multiple elements instead of single antennas, the two directed beams can be formed so as to reduce interference with other users on the network.

The transition from coherently combining beams to diversity beams can be based on measurements of the quality of the channel. There are several different approaches for measuring the quality of the channel. One approach is to measure the quality of signals received from the remote over the channel. Another approach is for the remote to measure the quality of signals that it receives over the channel. In the context of a cellular type of system with large complex base stations and relatively simple, inexpensive remote radios all communicating with the base station, it may be less costly to use measurements made at antenna arrays of the base station. This is not necessary, however, to obtain the benefits of the present invention.

A particularly relevant quality of the channel is the transmit coherency. This can be seen as a measure of how coherently the signals transmitted from two or more transmit arrays are received by a remote antenna. This can be evaluated by looking at the correlation of the signal as received at the two or more arrays, the eigenvectors or eigenvalues of cross-correlation matrices or the angular spread of the received signal among others.

Many of the quality measurements of the channel can be seen as measurements of the angular spread of the received signal. The angular spread is a way to characterize the variation in angle of arrival of the signal. If the stronger ones of the components of the signal consistently are received within a narrow angular range, then the two arrays can best be used by coherently combining the signals for enhanced beam forming. If the stronger components of the signal show large differences in angle of arrival or if there is no clear strongest component, then the two arrays can best be used each as separate diversity antennas. The angular spread can be evaluated in many different ways. Values related to the angular spread are commonly determined in the context of spatial processing. As a result, in an SDMA system, the degree of angular spread can be determined easily and quickly with no great impact on system resources or processing allocations.

Process Flow

Figure 5:
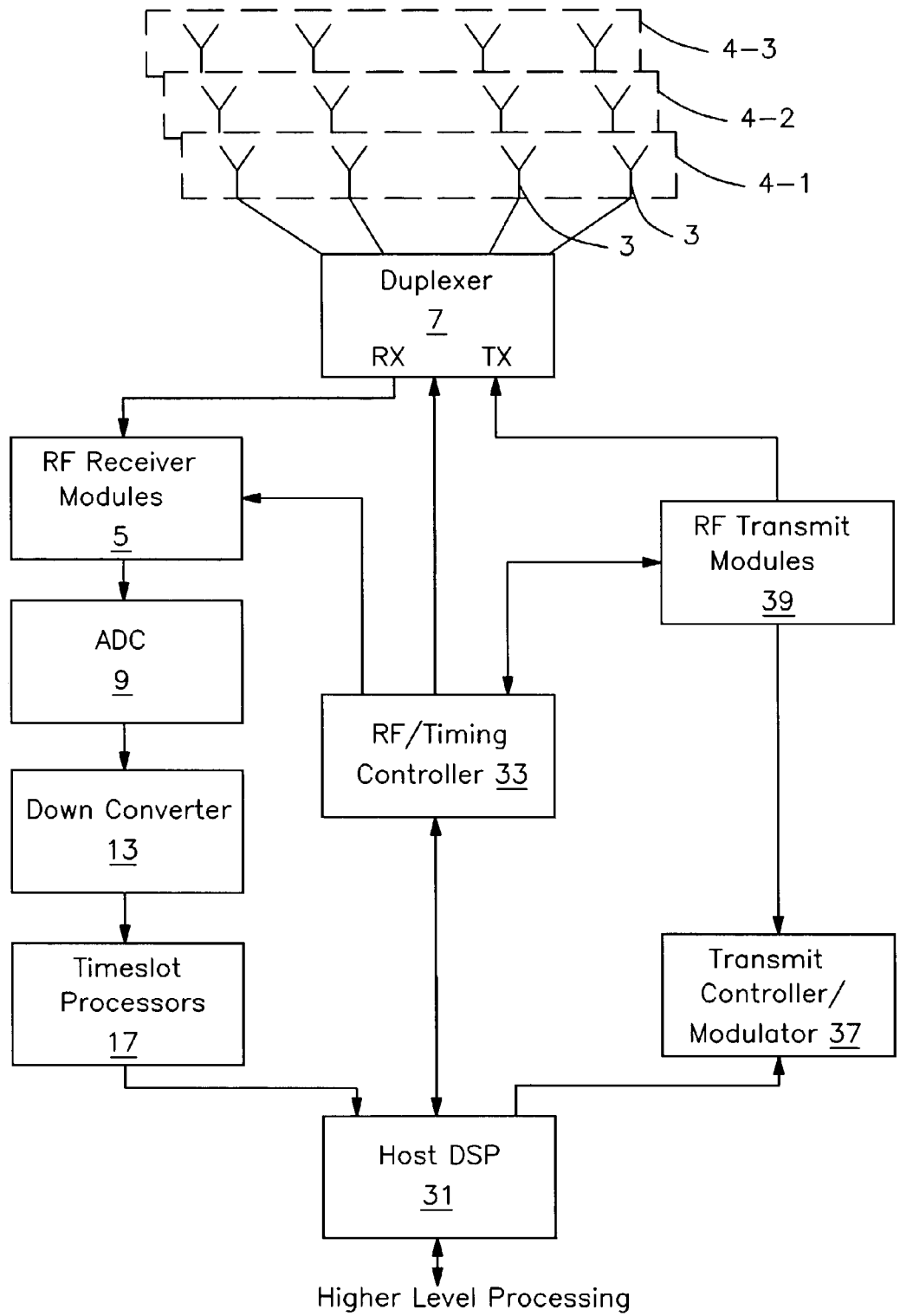
FIG. 5 is a block diagram of a base station on which an embodiment of the invention can be implemented.

Referring to FIG. 1, a base station, such as the one shown in FIG. 5, receives uplink signals at its antenna arrays 101, such as the arrays 4 of FIG. 5. In a simple embodiment as discussed herein, the base station will have two antenna arrays and each array will have several elements. Four elements are shown in FIG. 5, however, there may be more or fewer elements in each array. Each array may even be made up of only a single element. Similarly there may be more than two arrays. The arrays can be set up to provide any type of diversity desired and any combination of diversity effects. In the illustrated embodiment, the same antenna arrays are used for receiving and transmitting, however, different arrays can be provided for each.

The base station, using samples of the received signal, measures the transmit coherency of the received signal 103. This can be done in a variety of different ways including those described below. Using the transmit coherency measurement, the base station then can select whether to apply coherent combining to any signal transmitted to the remote terminal 105 and whether to apply transmit diversity to any signal transmitted to the remote terminal 107. These decisions can be made in any of a variety of different ways as also described further below. Having made these decisions, the base station can determine signal transmission parameters to apply to its transmit antenna arrays 109 and transmit signals to the remote terminal accordingly 111. The signal transmission parameters can include spatial signatures, weight vectors, filter parameters, polarization weighs or any other type of transmission parameters that can be applied to the particular antenna arrays.

Figure 2:
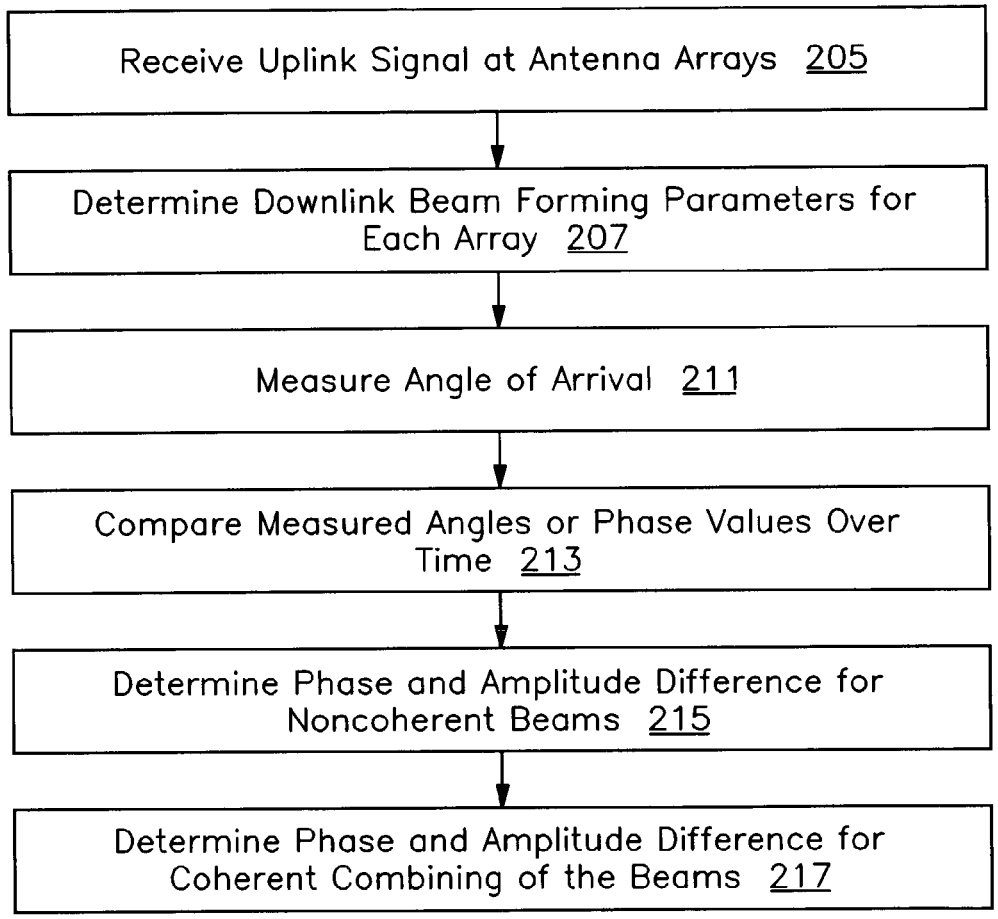
FIG. 2 is a flow chart showing the embodiment of FIG. 1 in greater detail.

FIG. 2 shows the process of FIG. 1, above in more detail. To begin, the base station receives uplink signals at its receive antenna arrays 205. As mentioned above, the receive arrays may or may not be the same as the transmit arrays. The base station determines downlink parameters that will result in a beam being formed from each array toward the remote radio 207. Applying principles from one type of spatial division system, the base station can measure parameters of the received signal at elements of each array, derive a receive spatial signature and weight vector, then use those to derive a transmit spatial signature and weight vector. The transmit spatial signature and weight vector are applied as spatial parameters to the respective array in transmitting to the remote radio so that a beam is formed that directs energy to the remote radio. A different set of spatial parameters can be used for each array based on the received signal at each array, or the same set of spatial parameters can be applied to all antenna elements of all the arrays. There are a large variety of approaches to determining appropriate spatial parameters for a spatial diversity system that are well-known in the art. Any suitable approach may be applied to this embodiment of the invention.

If each array is a single element, then beam forming within each array is probably not possible. However, it may be possible to use the arrays in combination to derive a spatial signature that can be used for coherently combining the beams from each single-element array, when appropriate.

In one embodiment, the arrays provide spatial diversity and so are spaced apart from each other. If the same arrays are used for receiving and transmitting, the spacing will depend upon both uplink and downlink frequencies. The multiple arrays allow a strategy to be selected that maximizes the power received at a remote radio, such as the user terminal shown in FIG. 6. This can be done by finding downlink phase and amplitude differences that exploit the capabilities of the arrays to the greatest benefit. In one embodiment, the phase and amplitude differences of a received signal are used to determine a phase difference to apply to the transmit arrays that maximizes the power delivered to the remote radio. An amplitude difference can be applied to the transmit arrays instead of a phase difference or in addition to a phase difference. The average delivered power as seen by the remote will include power received by the remote radio after combining any coherent signals and after any gain from combining diversity signals. The gain may occur in the propagation channel (i.e. in the airwaves) or in the equalizer, RAKE receiver, or other signal processing system of the user terminal.

While in many cases, received power can be maximized by directing different beams to the remote from different antenna arrays so that the beams coherently combine at the intended remote, this is not always the case. Notwithstanding the great benefits of spatial division communications systems, in environments with high clutter or scattering, delayed multipath signals from directed beams can interfere with the beam forming aspects of the spatially directed beam. As a result, a precisely directed signal may not be received clearly when an omni-directional beam would have been.

Such high clutter conditions, however, are often very well suited to diversity transmission. In addition, spatial division hardware with multiple transmit chains and multiple antenna arrays can easily be adapted to provide transmit diversity. The antenna arrays can be designed to each transmit a different version of the communications signal. The versions can differ by having different coding, different modulation different amplitudes and different phases or delays. A variety of different diversity transmission schemes are possible. Some mobile radio standards explicitly provide for diversity schemes which can then be exploited for diversity transmission. For example, the CDMA 2000 and proposed WCDMA standards offer a transmit diversity mode based on space time block coding. GSM and DAMPS remotes are required to be able to receive signals with some delay spread. This enables the use of delay diversity signals.

A spatial division system is also very well suited to determining when beam forming or a diversity scheme is best used. In a typical spatial division system, the signal from each receive element is measured and the relative phases and amplitudes for each antenna element are determined. This determination is used to determine a spatial signature for the terminal from which the signal was received. However, the measured phases or amplitudes or both from several different arrays can also be used directly to determine the nature of the radio environment. One such direct use is to determine the transmit coherency of the received signal, for example by measuring the angular spread. When the measurements indicate that diversity transmission should be used, then the diversity transmission mode can be switched or phased in accordingly. Other tests can also be applied to make this determination either in combination with or separately from the phases and amplitudes.

Figure 6:
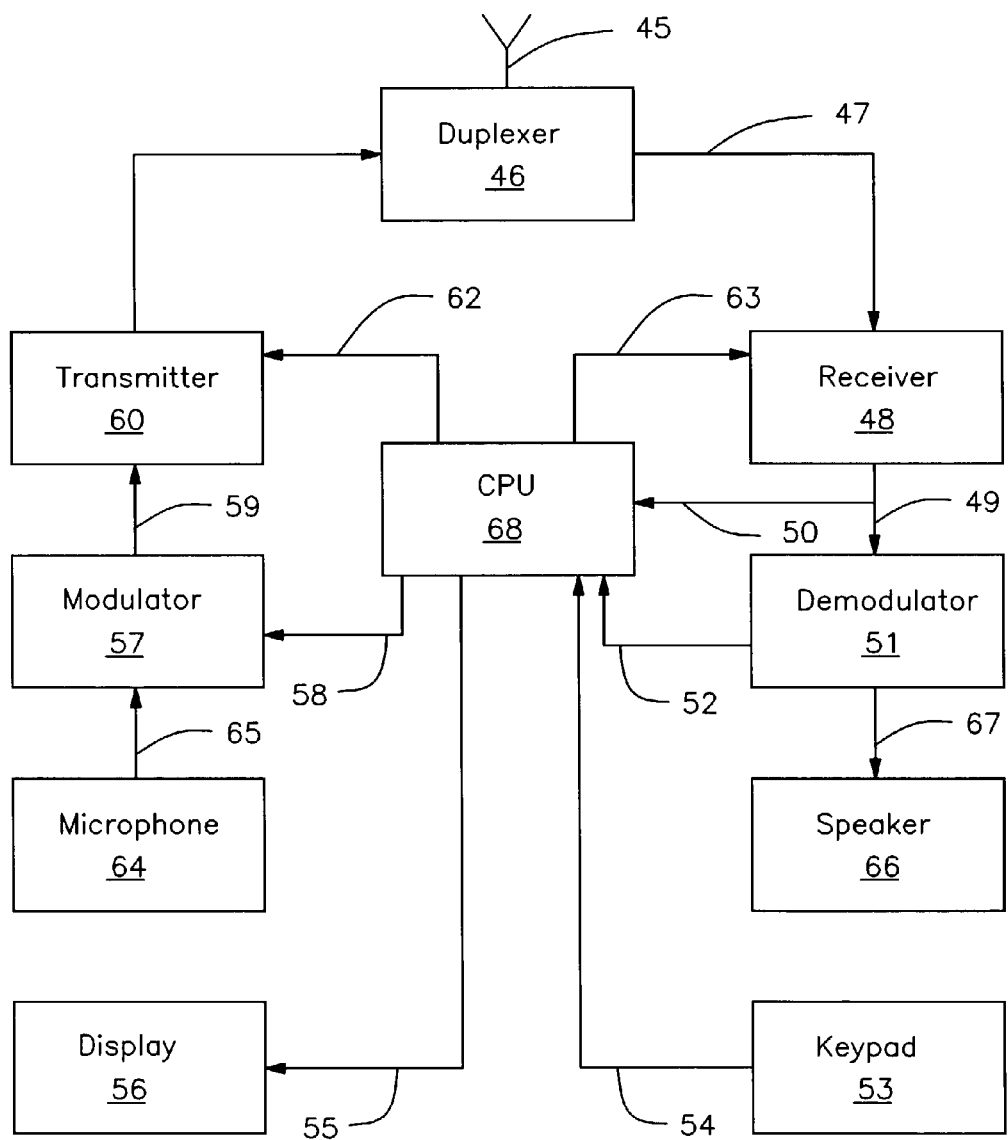
FIG. 6 is a block diagram of a remote terminal on which an embodiment of the invention can be implemented.

The benefits of diversity transmission are greater in some systems than in others. In many cellular mobile radio systems, the user terminal is required to incorporate a capability to demodulate a received signal even when this signal contains delayed copies (echoes) of the nominal signal expected from the base station. Most cellular telephone standards, for example, include such a requirement. The specific requirements vary depending on the standard involved. The delay is often expressed in terms of chips or symbols. This capability is normally provided by a RAKE receiver or an adaptive channel equalization filter in the CPU 68 or demodulator 51 of the mobile unit as shown in FIG. 6.

One way to measure the transmit coherency of the channel is to determine the angular spread of the received signal. This can be done using comparative phase measurements at either one or both of the arrays. In one embodiment, angular spread can be estimated even when each array has only a single element by comparing the relative phases and amplitudes of each array. The angle of arrival can be measured at either array 211 by comparing one antenna element's received signal to another or by comparing a group of elements, up to and including an entire array to another group of elements. The phase of the received signal can be sampled and then the measured angles or phase values can be compared over a selected amount of time 213. It is not necessary to know the absolute angular range of the received signal. A relative indication of the range that can be compared to a threshold or scale is enough since the resulting angle of arrival is used to measure only the quality of the channel.

In another embodiment, angular spread can be measured by comparing the phase ramp of a received signal across a set of antenna elements to an expected pattern. For example, if the antenna elements are arranged as a uniform linear array (ULA) then if the signals have no angular spread, the phase ramp across the elements at any one time should be linear as well. In other words, at any one time, in the absence of any angular spread, the difference in the phase of a received signal should be the same from each element to the next. A similar model can be developed for any other type of structure. The extent to which the phase ramp differs from the expected model can be used to estimate the angular spread. With a ULA the amount by which the phase ramp varies from a straight line indicates the angular spread.

In another embodiment, the transmit coherency can be estimated using eigenvectors of a covariance matrix, as will be discussed in more detail below. In one embodiment, if there is a single dominant eigenvector across both arrays for a received signal, then the angular spread is small. If there are two or more eigenvectors with eigenvalues of similar magnitude, then the angular spread is likely larger than for the single eigenvector case.

The relative result in whatever form can then be used to select transmit diversity or coherent combining of transmissions from the arrays. The analysis of the transmit coherency of the received signal and the selection of parameters for transmitted signals can be performed in the base station DSP 31 as shown in FIG. 5, or in any other available processing resource. In one embodiment, the receive angular spread of the received signal is analyzed against a threshold. If the receive angular spread is more than a threshold amount, then a phase and amplitude difference are determined that cause a different noncoherent beam to be transmitted from each array, i.e. spatial diversity 215. On the other hand, if the receive angular spread is less than the threshold amount, then a phase and amplitude difference is determined that causes coherent combining of the transmitted signal between the transmit antenna arrays, i.e. spatial division 217. The threshold can be developed with hysteresis.

The selection of thresholds will depend on the particular application. One important consideration can be the capability of the receiver at the user terminal to which the signal is to be sent. In either event, a phase and amplitude difference are selected, where feasible, to maximize average power delivered to the remote radio. The power can be maximized by careful selection of phasing between the two arrays or of power or of both.

If transmit diversity is selected, then each antenna array will transmit its signal independently of the other at about the same time. The formed beams will differ some because they are independently formed based on data collected from different antenna arrays. To further enhance performance, any one or more of a variety of different diversity techniques can be layered onto the two independent signals. Delay diversity can be added by imposing an appropriate delay, e.g. two to four symbols, between the transmission times of the two signals. For CDMA systems, space time block coding or some other type of transmit diversity can be added by controlling the scrambling codes, timing and other aspects of the signals.

If coherent combining is selected, then the phases can be adjusted in light of the distance between the arrays and the angle to the remote in order to assure that the signals will combine coherently at the remote. If a transmit spatial signature or a direction of arrival has been determined then this can be used in determining the phases to ensure that coherent combining will occur at the approximate location of the receiving terminal. Note that with some diversity schemes, such as space time block coding, coherent combining can be combined with diversity in the transmission from the transmit antenna arrays.

One way to determine the phases and amplitudes for the formed beams is to first compute estimates of the direction of arrival of the received or uplink signals. Typically there will be some angular spread and the direction of arrival will be in the form of a range. A dominant one of the directions of arrival can be selected within the measured range. Based on the selected direction of arrival, a transmit spatial signature can be derived that corresponds to the received direction of arrival. The complex conjugate of this spatial signature vector can be used as a transmit weight vector.

It is also possible to compute weight vectors belonging to only one or the other of the arrays using data collected from both arrays simultaneously. For example in a two-element system, both weight vectors, one for each array, can be computed using receive signal information from both arrays. The data from the other array can be used to better form a beam that will maximize the beamforming gain for the two arrays in combination. Alternatively, the data can be combined from both arrays to maximize the diversity benefits of the beam from each of the two arrays.

Figure 3:
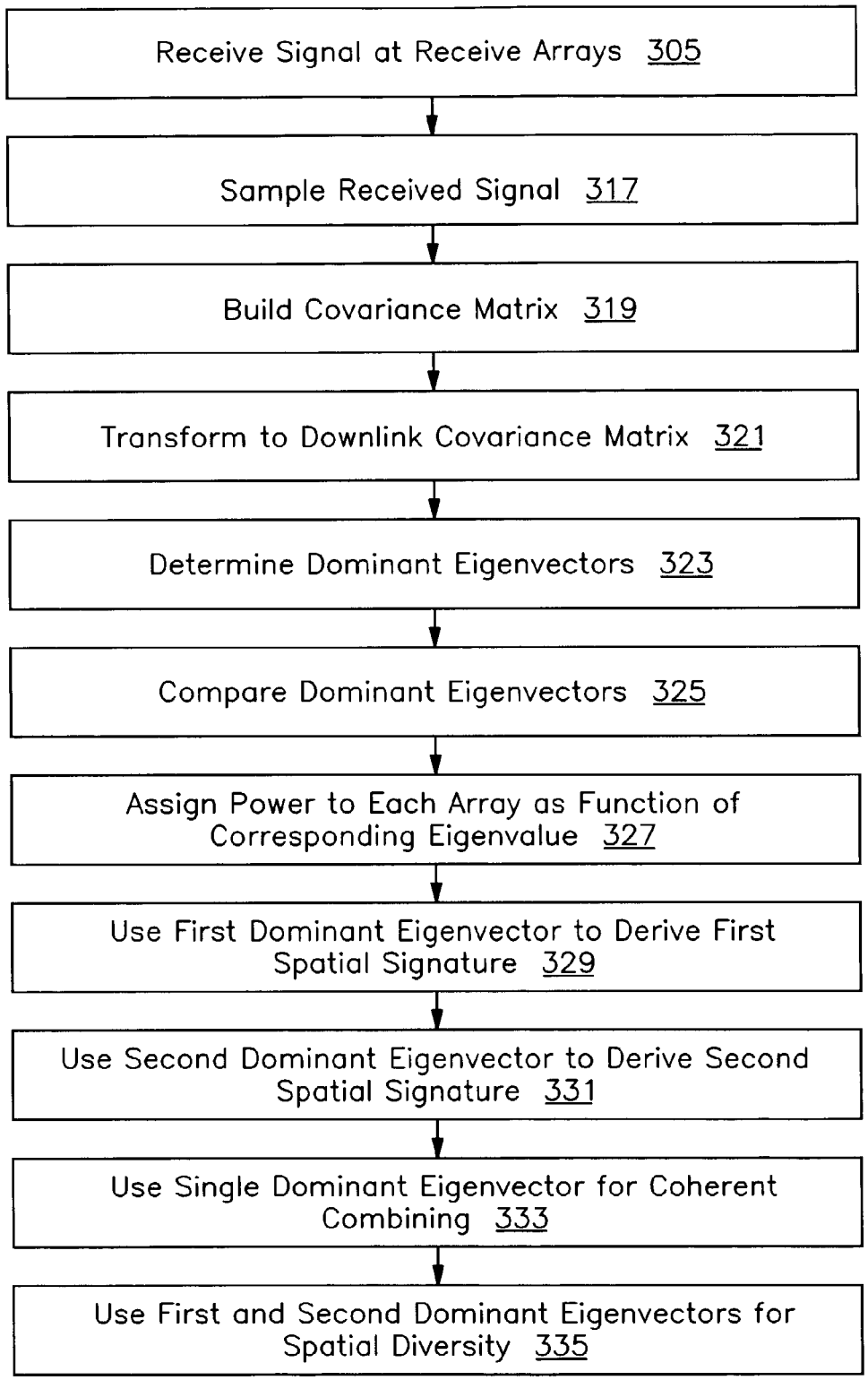
FIG. 3 is a flow chart showing another embodiment of the present invention.

In an alternative approach, as shown in FIG. 3, spatial processing techniques can be used to determine how best to maximize the user terminal's received power. While the approach which follows is particularly well-suited to spatial division processing systems that use covariance matrices and spatial signatures, it can be applied to any type of system. To begin, the signal is received at the uplink or receive arrays 305 and the received signal is sampled 317. In one embodiment, the signal is sampled at every element of each array. This is convenient when the signal is already sampled in order to be effectively demodulated. However, it is not necessary that samples from every single element be used. Typically, the receive arrays and the transmit arrays are the same arrays, however, this is not necessary.

While spatial processing techniques can be used, it is more difficult to find a phase difference that will maximize the average power delivered to the mobile station for a set of arrays than it is to maximize the average power from elements of a single array. A relatively small angular spread can render the signals received at two spaced arrays uncorrelated. A much larger angular spread is required to make the signal received at the closely spaced elements of a single array uncorrelated. To maximize the delivered power using spatial techniques the antenna arrays are co-phased. This gives the mobile station some coherent combining gain.

The success of any co-phasing can be predicted with the help of eigenvalues of a spatial covariance matrix. A covariance matrix can be built from the samples 319. This is the same type of covariance matrix that can be applied to conventional spatial processing. For a set of spatial diversity arrays, the covariance matrix can be a long term spatial covariance matrix built from samples from both arrays. The matrix can be long term in that samples are collected over a time long enough for the signal to experience several fades. A longer term matrix may provide a more reliable result, however, the specific number of samples collected will depend on the particular application. The term of the matrix can be selected based on several criteria. These may include the maximum length of time for any fading in the single receive channel, differences in the receive channel that may be caused by any frequency hopping, and any temporal variations resulting from mobility or other changes.

The covariance matrix is constructed in the conventional manner except that all of the elements of all of the arrays are included. In one embodiment, the antenna elements are applied in a positional order from left to right and top to bottom sequentially through all of the arrays. However, the particular order is not important. The covariance matrix can be expressed as:

$$R_{zz} = \frac{1}{N}\sum_{N=1}^{N} z(t)z^{H}(t)$$

where $R_{zz}$ is the covariance matrix, N is the number of samples collected over time, and $z=(z_1, z_2, \ldots z_M)$ is a vector, e.g. a column vector, corresponding to the samples z from each of M antenna elements of all the arrays at N different times t. To include all of the arrays, the samples, z, can represent each element of each array, successively, in some linear ordering. Conventionally, each term $z_m$ is formed as a complex number that expresses the phase and amplitude of a measured signal. Alternatively, the same matrix structure can be built from a sum of covariance matrices. Each matrix can correspond to a different array or each matrix can correspond to channel measurements of different taps of a multi-tap channel.

Once the long term covariance is established it can be transformed to a downlink covariance matrix 321. This conversion will depend on the difference between uplink and downlink frequency. If they are the same, then the uplink covariance matrix can be used as the downlink covariance matrix. If there is a difference in frequency then the phases need to be converted. The phases in the uplink covariance matrix correspond to angles of arrival of the sampled signal. The angles of arrival from the uplink can be used as the angles for the downlink transmission. The phases can be converted to correspond to the same angles at the downlink frequency. In one embodiment, the average phase of each element corresponding to one of the arrays is compensated to the desired phases for the downlink. This can be done by multiplying each term of the off-diagonal blocks of the covariance matrix by an appropriate phasor. There are also other approaches to performing this conversion. Many other approaches can be used as alternatives.

When transforming receive spatial signatures, weight vectors, covariance matrices or any other channel indicator from a receive version to a transmit version, several compensations can be accommodated. Factors to compensate include the nature of the diversity of the antenna arrays and the type of duplexing that is used for transmit and receive. For example, if the arrays are spatially separated and frequency division duplexing (FDD) is used, then the spatial separation between the arrays can be compensated as well as the difference in frequency between the receive and transmit signals.

The dominant eigenvectors can be determined from the downlink matrix 323, using conventional methods. The dominant eigenvectors can then be compared 325. Dominance can be measured by taking eigenvalues of each of the eigenvectors and comparing the absolute value of each eigenvalue. The particular number of dominant eigenvectors to be used can be varied to suit system requirements. In a mobile cellular system, two or three eigenvectors may be sufficient. It can be useful to set some parameters to determine which eigenvectors are dominant. Accordingly, if one eigenvector has a substantially larger eigenvalue than any of the others, it can be selected. If several are within a particular range, they can all be selected. The difference required to constitute being substantially larger can be adapted for each system. From the comparison of the dominant eigenvectors, power can be assigned to each array as a function of the corresponding eigenvalue 327. As an alternative to the matrix described above, several matrices can be created, each corresponding to a particular time or receiver tap. The dominant eigenvectors for each matrix can then be compared to select the dominant eigenvectors overall.

Spatial signatures can be derived from the covariance matrix using the dominant eigenvectors. The dominant eigenvectors also provide a measure of the transmit coherency. One approach is to use the first and second dominant eigenvectors to derive first and second spatial signatures 329, 331 that can be applied to both arrays. If a single dominant eigenvector has been selected, then the single eigenvector will be applied to both arrays and the beams transmitted from the two arrays 333 will coherently combine. If the dominant eigenvector of a joint covariance matrix for all arrays has an eigenvalue which is considerably larger than the other eigenvalues, then this corresponds to a high transmit coherency between the arrays. Note also that the beam forming at each array described above with respect to FIG. 1 can also be accomplished using the eigenvectors of the covariance matrices.

If two dominant eigenvectors are selected, the eigenvectors may have a greater amplitude in one array than the other, so the two dominant eigenvectors will be dominant in different arrays. The two dominant eigenvectors correspond to a low transmit coherency for the received signal. Using the above approach of assigning both eigenvectors to both arrays will result in each array primarily transmitting a signal based on just one of the eigenvectors. This will result in a spatial diversity transmission 333. As with the single eigenvector case, the spatial signatures derived from the eigenvectors will provide beam forming at the respective array as well as the spatial diversity parameters.

The transmitted signal can be simplified for the two eigenvector case by looking at the relative amplitudes of the eigenvectors in each array. The dominant array for each eigenvector can be determined and each eigenvector can be assigned to its dominant array, i.e. the array at which the eigenvector elements are the largest. Sending a signal corresponding to only one eigenvector from each array, reduces the possibility of destructive interference between the arrays.

If the covariance matrices are built so that the ordering of the elements of the matrices corresponds to the physical order of the antenna elements, then this can be exploited to assign eigenvectors to arrays. In a single eigenvector case, the first half of the components of the single selected dominant eigenvector can be used to get a downlink spatial signature for the first array 329. The second half of the components of the dominant eigenvector can be used to get the downlink spatial signature for the second array 331. If there are more than two arrays, the appropriate portions of the covariance matrix can be used corresponding to each array. The resulting spatial signatures and weights are then applied to transmit a signal through the arrays based on the received signal 333. The spatial signature and weights, as described above, can be selected to preserve or transform the amplitude and phase from reception to transmission. Similarly, if there are two dominant eigenvectors, a single dominant eigenvector can be selected for each half or portion of the matrix. The dominant eigenvector for any one portion of the matrix can be selected for application to the array corresponding to that portion of the matrix.

As an alternative to converting the uplink covariance matrix to a downlink covariance matrix, the dominant eigenvectors can be determined from the uplink covariance matrix. Uplink spatial signatures can be derived from these eigenvectors using techniques well-known in the art. Then the uplink spatial signatures can be converted to downlink spatial signatures which can then be used to set phases and amplitudes to apply to the transmit chain. Similarly uplink weight vectors can be derived from the eigenvectors and converted to downlink weight vectors for use in transmission.

As mentioned above, using the two most dominant eigenvectors of a joint covariance matrix for all arrays, provides a decision mechanism between coherent combining of the signals from the at least two arrays and noncoherent diversity transmission. Comparing the two most dominant eigenvectors provides a measure of transmit coherency. Depending upon how correlated the channels of the two arrays are, in some cases, there will be a very strong single dominant eigenvalue and the other eigenvalues will be much lower. This case corresponds to a high transmit coherency and a narrow angular spread. In this case, the corresponding single dominant eigenvector can be used exclusively to establish the downlink phases and amplitudes. If a secondary eigenvector is used it may contribute so little as to be insignificant. Accordingly, it can be ignored. A threshold can be established so that the second largest eigenvalue must be within some fraction of the largest eigenvalue in order to be used. Using just one eigenvector, the arrays can be phased for coherent combining. This provides the optimum amount of beam forming.

As the magnitude of the secondary eigenvalue increases relative to the first, noncoherent diversity transmission can be selected. The power of the transmissions corresponding to the two dominant eigenvectors can be a function of the magnitude of the corresponding eigenvalue. The power can be scaled by a factor which is a function of the magnitude of the corresponding eigenvalue, including the eigenvalue itself. One eigenvector can be assigned to each array so that a signal based on one eigenvector will be sent from one of the arrays and a signal based on another eigenvector will be sent from another array. In a two-array system, when the eigenvalues are nearly the same magnitude and signals based on the two eigenvectors are sent only from different ones of the two arrays, the transmissions from the two arrays will be nearly the same amplitude but will have different characteristics based on the two different eigenvectors. This corresponds to a transmit diversity mode. It also corresponds to a large amount of angular spread.

The beam from each array can also be transmitted with spatial characteristics suggested by some other spatial strategy. Any of the transmissions mentioned above can be further optimized with other techniques and spatial strategies. Such techniques may include directing nulls to other users, compensating for frequency or amplitudes shifts inherent in the particular system and a wide range of different types of calibration.

Figure 4:
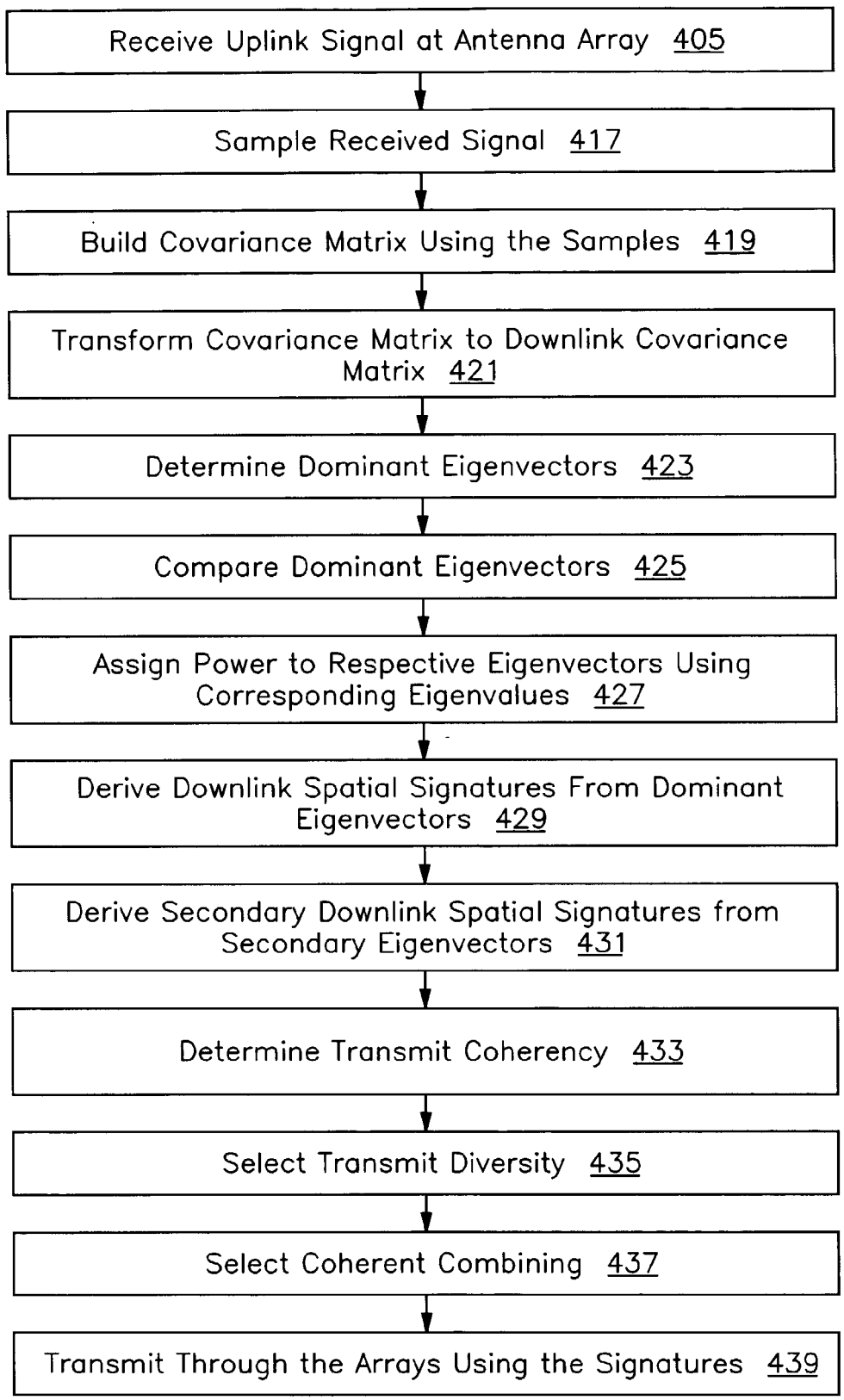
FIG. 4 is a flow chart showing another embodiment of the present invention.

In another embodiment, the angular spread can be used to improve how the eigenvectors are used. Referring to FIG. 4, a process is shown which combines the application of angular spread with the determination of dominant eigenvectors. As discussed above with respect to FIG. 3, the uplink signal is received at the antenna arrays 405. The received signal is sampled 417 and a covariance matrix is built using the samples 419. The covariance matrix based on the samples can be transformed to a downlink covariance matrix 421. Or the eigenvectors can first be determined and they can be transformed to downlink vectors.

From the covariance matrix whether uplink or downlink, the dominant eigenvectors are determined 423 and compared 425. Power is assigned to the respective eigenvectors using the corresponding eigenvalues 427, and downlink spatial signatures are derived from the dominant eigenvectors 429. Alternatively, other signal transmission parameters can be used, such as weight vectors, filter taps or any other type of parameters that can be applied to antenna arrays. This may include deriving secondary downlink spatial signatures from secondary eigenvectors 431 depending on how many dominant eigenvectors are found.

In this embodiment, before, the signals are transmitted, angular spread or some other measure of transmit coherency is determined 433 and applied to the spatial signatures and weights or to the eigenvectors as desired by the system designer. Using the angular spread, either transmit diversity 435 or coherent combining 437 can be selected. This can be done using principles similar to those discussed above with respect to FIG. 2. The angular spread determination can be made using the approaches discussed above or by analyzing the eigenvectors. For example, if only one dominant eigenvector is found, then the angular spread is likely to be very low and coherent combining can be applied. If there are two or more dominant eigenvectors, then the angular spread is probably high enough that transmit diversity should be used. In another embodiment, if each dominant eigenvector is dominant only at a single array and no two eigenvectors are dominant at the same array then the channels at each array are probably uncorrelated and transmit diversity can be used. On the other hand, if all the dominant eigenvectors show similar amplitudes at each array, then coherent combining can possibly be used.

This approach can be applied using thresholds, the angular spread can be used to select transmit diversity from each array. If the angular spread is greater than a threshold, then the phase and amplitude settings can be adjusted so that each eigenvector is applied only to its one dominant array. The signal from each array accordingly will be based on different eigenvectors. This eliminates the risk of the coherent combining between the arrays failing and the signals instead destructively combining due to grating lobes. In other words, it prevents the remote terminal from being in a null of the grating lobes of the signal sent from the combined arrays.

On the other hand, if the angular spread is less than a threshold, it can be used to select a spatial division or coherent beam forming mode. The phase and amplitude settings can be adjusted to transmit from each array based on the same eigenvectors. This enhances the level of coherent combining at the remote radio.

After the spatial signatures have been completely determined the signal is transmitted through the arrays using the signatures 439. As mentioned above, any type transmit diversity scheme can be combined with the spatial diversity described above, such as space time block coding or delay diversity. Further spatial processing techniques such as nulling can also be applied to the transmitted signals.

Switching Rules

The description above provides several different ways to select between coherent combining and transmit diversity. The choice between these two modes can be considered as switching rules and there are many different possible rule systems that can be applied in a particular implementation of the present invention.

In one example embodiment, the wireless communication system uses spatially separated arrays, possibly with different polarization, and FDD (frequency division duplexing). In such a system, if the transmit coherency of the signals at the two different arrays is above some threshold, then coherent combining can be selected. On the other hand, if the transmit coherency of the signals at the two different arrays is below some threshold, then diversity transmission can be selected. The transmit coherency between the signals at each array can be characterized using several different measures. Several measures of the transmit coherency can be combined in order to determine the transmit coherency of the signals of the two arrays. One measure is an estimate of the angular spread of the signal as seen from the receiver, for example a base station. A larger angular spread is a measure of less transmit coherency of the signals of the two different arrays.

Another measure of transmit coherency is the correlation between the signals at the different arrays. A larger correlation is a measure of larger transmit coherency of the signals of the two different arrays. The correlation between the signals can be computed as the average of the correlations of a collection of pairs of signals associated with elements in different arrays. That is, each pair of signals has one signal from one element in one array and another signal from a different element in another array. The signals can be compiled into a long term covariance matrix and the eigenvalues computed. The eigenvalues of this receive (or, alternatively, the transmit) long term spatial covariance matrix can be examined to find the spatial signatures or weight vectors that span signals from both arrays. The size of the largest eigenvalue as compared to the other eigenvalues can be used as a measure of the transmit coherency of the signals at the two arrays. The larger the dominant eigenvalue is as compared to the other eigenvalues, the larger the transmit coherency of the signals of the different arrays.

In another embodiment, the wireless communication system can use arrays with different polarizations that are collocated with FDD. In such a system, the transmit coherency of the signals of the two different arrays can be used as a threshold as described above. If it is above some threshold, coherent combining can be used across the two arrays. If the transmit coherency of the signals of the two different arrays is below some threshold, then polarization diversity can be used.

The transmit coherency of the of the signals of the two arrays can be characterized by examining the eigenvalues of the receive (or possibly the transmit) spatial covariance matrix for the spatial signatures or weight vectors spanning both arrays. The size of the largest eigenvalue as compared to the other eigenvalues can be used as a measure of the transmit coherency of the signals at the two arrays. The larger the dominant eigenvalue is as compared to the other eigenvalues, the larger the transmit coherency of the signals of the different arrays The present invention can also be implemented as a TDD (time division duplexing) embodiment, that uses spatially separated arrays, with or without different polarizations. Such a system can be characterized as described above or using the temporal rate of change of the channel, since the receive and transmit channels are virtually identical. If the rate of temporal change of the channel to the remote terminal is below some threshold, then coherent combining can be used. Alternatively, if the rate of temporal change of the channel to the remote terminal is above some threshold, then spatial diversity can be used. The rate of temporal change in the channel can be measured using a variety of techniques well-known in the art.

In a TDD system that uses arrays with different polarization that are spatially co-located, the rate of temporal change can also be used in a similar fashion as described above. However, if the rate of temporal change of the channel to the remote terminal is above some threshold, then transmit coherency can also be measured. Accordingly, if the transmit coherency of the signals of the two different arrays is above some threshold, then coherent combining can still be used. While, if the transmit coherency of the signals of the two different arrays is below some threshold, and the rate of temporal change is above the threshold then polarization diversity can be used. The transmit coherency of the of the signals of the two arrays can be characterized in the same manner as described above for the other examples.

All of the switching rules discussed above are described in the context of thresholds. The particular thresholds selected for any particular application will depend on many different system parameters including the nature of the arrays, the nature of the modulation and communication signaling systems as well as the environment in which the system is deployed. In addition, thresholds need not be used. They are used in the present description for simplicity but a variety of other control mechanisms well-known in the art can be applied instead. The switching examples given above are used to illustrate examples of how to apply the principles of the present invention to different systems and is not an exhaustive list of all possible applications of the present invention.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. Nos. 5,828,658, issued Oct. 27, 1998 to Ottersten et al. and 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

FIG. 5 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 6. The base station may be connected to a wide area network (WAN) through its host DSP 31 for providing any required data services and connections external to the immediate wireless system.

To support spatial diversity, a plurality of antennas 3 is used, for example four antennas, although other numbers of antennas may be selected. Each antenna is an element of a four-element array 4. And a plurality of arrays are provided 4-1, 4-2, 4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element. In another embodiment, the arrays are oriented in different polarization directions. Such arrays can be spaced apart or collocated.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

FIG. 6 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and, transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   receiving a signal from a remote radio;
   measuring the transmit coherency of the received signal;
   selecting, based on the transmit coherency, whether to apply coherent combining to signals transmitted to the remote radio using each of two transmit antenna arrays to each form a beam, each transmit antenna array forming a respective beam using a separate phased array of antenna elements, the beams to coherently combine with each other beam in the propagation path; and
   building a covariance matrix from samples and determining dominant eigenvectors corresponding to the dominant eigenvalues of the covariance matrix for each array and determining signal transmission parameters to apply to each of two transmit antenna arrays by applying the dominant eigenvectors.

2. The method of claim 1, wherein receiving a signal comprises receiving a signal at two antenna arrays and wherein measuring the transmit coherency comprises measuring the transmit coherency of the received signal between the two antenna arrays.

3. The method of claim 1, further comprising selecting, based on the transmit coherency, whether to apply transmit diversity to signals transmitted to the remote radio using each of the two transmit antenna arrays as diversity antennas determining phase and amplitude settings to apply to the two transmit antenna arrays and applying the determined phase and amplitude settings to the two transmit antenna arrays.

4. The method of claim 1, wherein measuring the transmit coherency comprises measuring a receive angular spread.

5. The method of claim 4, wherein measuring the receive angular spread comprises determining variations in angle of arrival of the received signal.

6. The method of claim 4, wherein measuring the receive angular spread comprises evaluating a measured phase ramp of the received signal across multiple antenna elements.

7. The method of claim 4, wherein measuring the receive angular spread comprises evaluating measured phases of the received signal across multiple antenna elements.

8. The method of claim 4, wherein measuring the receive angular spread comprises evaluating measured amplitudes of the received signal across multiple antenna elements.

9. The method of claim 1, wherein selecting whether to apply coherent combining comprises selecting to apply coherent combining to the transmitted signal if the transmit coherency is greater than a threshold.

10. The method of claim 1, further comprising selecting to apply transmit diversity to the transmitted signal if the transmit coherency is less than a threshold.

11. The method of claim 1, wherein applying coherent combining comprises applying coherent combining between the transmit antenna arrays.

12. The method of claim 10, wherein applying transmit diversity comprises applying spatial transmit diversity.

13. The method of claim 1, further comprising building a covariance matrix from the samples and determining dominant eigenvectors corresponding to the dominant eigenvalues of the covariance matrix and wherein measuring the transmit coherency comprises comparing the dominant eigenvectors.

14. The method of claim 13, wherein the covariance matrix comprises a receive covariance matrix, the method further comprising transforming the receive covariance matrix to a transmit covariance matrix, and wherein determining dominant eigenvectors comprises determining dominant eigenvectors of the transmit covariance matrix.

15. The method of claim 13, wherein building a covariance matrix comprises building a single long term covariance matrix using the samples of the received signal.

16. The method of claim 13, wherein receiving a signal comprises receiving a signal at a plurality of antenna arrays, each antenna array having a plurality of receiving elements and wherein building a covariance matrix comprises building a single long term covariance matrix using estimates of the received signal at each element of each array.

17. The method of claim 1, further comprising selecting to apply transmit diversity if the transmit coherency is less than a threshold, then selecting to transmit from each array using signal transmission parameters based on different eigenvectors for each array.

18. The method of claim 1, wherein selecting whether to apply coherent combining comprises if the transmit coherency is larger than a threshold, then selecting to transmit from each array using signal transmission parameters based on a single eigenvector being the dominant eigenvector of a covariance matrix for all arrays.

19. The method of claim 1, wherein determining signal transmission parameters comprises using a portion of values of a first dominant eigenvector to derive a first set of signal transmission parameters for a first transmit antenna array and a portion of values of a second dominant eigenvector to derive a second set of signal transmission parameters for a second transmit antenna array.

20. The method of claim 1, wherein the first set of signal transmission parameters comprises a first transmit spatial signature and weight vector and the second set of signal transmission parameters comprises a second transmit spatial signature and weight vector.

21. The method of claim 1, wherein determining signal transmission parameters comprises transforming the dominant eigenvectors to transmit spatial signatures for each array.

22. The method of claim 1, wherein determining signal transmission parameters comprises determining an amplitude setting that is a function of the amplitudes of the corresponding dominant eigenvectors.

23. The method of claim 1, wherein determining signal transmission parameters comprises using phase and amplitude differences in the dominant eigenvectors of the transmit covariance matrix to determine phase and amplitude differences to apply to the transmissions.

24. The method of claim 1, wherein the two transmit antenna arrays are spaced apart by more than double the wavelength of the transmitted signal and wherein each array has a plurality of transmitting elements, the elements of each array being spaced apart by less than double the wavelength of the transmitted signal.

25. The method of claim 1, wherein the two transmit antenna arrays are differently polarized.

26. A computer-readable medium having stored thereon data representing instructions which, when executed by a computer, cause the computer to perform operations comprising:
receiving a signal from a remote radio;
measuring the transmit coherency of the received signal;
selecting, based on the transmit coherency, whether to apply coherent combining to signals transmitted to the remote radio using each of two transmit antenna arrays to each form a beam, each transmit antenna array forming a respective beam using a separate phased array of antenna elements, the beams to coherently combine with each other beam in the propagation path; and
building a covariance matrix from samples and determining dominant eigenvectors corresponding to the dominant eigenvalues of the covariance matrix for each array and determining signal transmission parameters to apply to each of two transmit antenna arrays by applying the dominant eigenvectors.

27. The medium of claim 26, wherein the instructions for measuring the transmit coherency comprise instructions which, when executed by the computer, cause the computer to perform further operations comprising measuring a receive angular spread.

28. The medium of claim 27, wherein the instructions for measuring the receive angular spread comprise instructions which, when executed by the computer, cause the computer to perform further operations comprising evaluating a measured phase ramp of the received signal across multiple antenna elements.

29. The medium of claim 26, wherein the instructions for selecting whether to apply coherent combining comprise instructions which, when executed by the computer, cause the computer to perform further operations comprising selecting to apply coherent combining to the transmitted signal if the transmit coherency is greater than a threshold.

30. The medium of claim 26, further comprising instructions which, when executed by the computer, cause the computer to perform further operations comprising selecting, based on the transmit coherency, whether to apply transmit diversity to signals transmitted to the remote radio using each of the two transmit antenna arrays as diversity antennas.

31. The medium of claim 26, further comprising instructions which, when executed by the computer, cause the computer to perform further operations comprising building a covariance matrix from the samples and determining dominant eigenvectors corresponding to the dominant eigenvalues of the covariance matrix and wherein the instructions for measuring the transmit coherency comprise instructions which, when executed by the computer, cause the computer to perform further operations comprising comparing the dominant eigenvectors.

32. The medium of claim 26, further comprising instructions which, when executed by the computer, cause the computer to perform further operations comprising building a covariance matrix from the samples and determining dominant eigenvectors corresponding to the dominant eigenvalues of the covariance matrix for each array and determining signal transmission parameters to apply to the two transmit antenna arrays for transmissions to the remote radio by applying the dominant eigenvectors.

33. The medium of claim 32, further comprising instructions which, when executed by the computer, cause the computer to perform further operations comprising selecting, based on the transmit coherency, whether to apply transmit diversity to signals transmitted to the remote radio using each of the two transmit antenna arrays as diversity antennas and wherein if the transmit coherency is less than a threshold, then selecting to transmit from each array using signal transmission parameters based on different eigenvectors for each array.

34. The medium of claim 33, wherein the instructions for selecting whether to apply transmit diversity comprise instructions which, when executed by the computer, cause the computer to perform further operations comprising if the transmit coherency is larger than a threshold, then selecting to transmit from each array using signal transmission parameters based on a single eigenvector being the dominant eigenvector of a covariance matrix for all arrays.

35. The medium of claim 32, wherein the instructions for determining signal transmission parameters comprise instructions which, when executed by the computer, cause the computer to perform further operations comprising using a portion of values of a first dominant eigenvector to derive a first set of signal transmission parameters for a first transmit antenna array and a portion of values of a second dominant eigenvector to derive a second set of signal transmission parameters for a second transmit antenna array.

36. An apparatus comprising:
a receiver to receive a signal from a remote radio;
a processor to measure the transmit coherency of the received signal, to select, based on the transmit coherency, whether to apply coherent combining to signals transmitted to the remote radio using each of two transmit antenna arrays to each form a beam, each transmit antenna array forming a respective beam using a separate phased array of antenna elements, the beams to coherently combine with each other beam in the propagation path and to determine signal transmission parameters to apply to the two antenna arrays for transmissions to the remote radio based on the selection; and
a transmitter to transmit a signal to the remote radio from the two transmit antenna arrays by applying the determined signal transmission parameters to the two transmit antenna arrays,
wherein the two receive antenna arrays and the two transmit antenna arrays are spaced apart by more than double the wavelength of the transmitted signal, wherein each array has a plurality of antenna elements and wherein the elements of each array are spaced apart by less than double the wavelength of the transmitted signal.

37. The apparatus of claim 36, wherein the receiver includes two antenna arrays to receive the signal and wherein the processor measures the transmit coherency by measuring the transmit coherency of the received signal between the two antenna arrays.

38. The apparatus of claim 36, wherein the processor measures the transmit coherency by measuring a receive angular spread.

39. The apparatus of claim 38, wherein the receiver comprises multiple antenna elements and wherein the processor measures the receive angular spread by evaluating measured phases of the received signal across multiple antenna elements.

40. The apparatus of claim 36, wherein the processor selects whether to apply coherent combining by selecting to apply coherent combining to the transmitted signal if the transmit coherency is greater than a threshold.

41. The apparatus of claim 36, wherein the processor selects whether to apply transmit diversity to signals transmitted to the remote radio by selecting to apply transmit diversity to the transmitted signal if the transmit coherency is less than a threshold.

42. The apparatus of claim 36, wherein the two transmit antenna arrays are spaced apart by more than double the wavelength of the transmitted signal and wherein each array has a plurality of transmitting elements, the elements of each array being spaced apart by less than double the wavelength of the transmitted signal.

43. The apparatus of claim 41, wherein the two transmit antenna arrays are differently polarized.

44. An apparatus comprising:
a receiver to receive a signal from a remote radio;
a processor to measure the transmit coherency of the received signal, to select, based on the transmit coherency, whether to apply coherent combining to signals transmitted to the remote radio using each of two transmit antenna arrays to each form a beam, each transmit antenna array forming a respective beam using a separate phased array of antenna elements, the beams to coherently combine with each other beam in the propagation path and to determine signal transmission parameters to apply to the two antenna arrays for transmissions to the remote radio based on the selection; and
a transmitter to transmit a signal to the remote radio from the two transmit antenna arrays by applying the determined signal transmission parameters to the two transmit antenna arrays,
wherein the two transmit antenna arrays are spaced apart by more than double the wavelength of the transmitted signal and wherein each array has a plurality of transmitting elements, the elements of each array being spaced apart by less than double the wavelength of the transmitted signal.

45. The apparatus of claim 44, wherein the processor measures the transmit coherency by measuring a receive angular spread by evaluating measured phases of the received signal across multiple antenna elements.

46. The apparatus of claim 44, wherein the processor selects whether to apply coherent combining by selecting to apply coherent combining to the transmitted signal if the transmit coherency is greater than a threshold.

* * * * *